United States Patent
Guo et al.

(10) Patent No.: US 12,311,329 B1
(45) Date of Patent: May 27, 2025

(54) DEVICES AND METHODS FOR CONTROLLING PRESSURE OF HIGH-TEMPERATURE AND HIGH-PRESSURE REACTORS

(71) Applicant: CHINA UNIVERSITY OF GEOSCIENCES (WUHAN), Hubei (CN)

(72) Inventors: Haihao Guo, Wuhan (CN); Jinlong Li, Wuhan (CN); Xinshui Wang, Wuhan (CN); Zaicong Wang, Wuhan (CN); Yufei Zhao, Wuhan (CN)

(73) Assignee: CHINA UNIVERSITY OF GEOSCIENCES (WUHAN), Wuhan (CN)

( * ) Notice: Subject to any disclaimer, the term of this patent is extended or adjusted under 35 U.S.C. 154(b) by 0 days.

(21) Appl. No.: 18/820,231

(22) Filed: Aug. 29, 2024

(51) Int. Cl.
  *B01J 19/00*  (2006.01)
(52) U.S. Cl.
  CPC .. *B01J 19/0013* (2013.01); *B01J 2219/00051* (2013.01); *B01J 2219/00162* (2013.01)

(58) Field of Classification Search
  CPC .... B01J 19/00; B01J 19/0009; B01J 19/0013; B01J 2219/00; B01J 2219/00049; B01J 2219/00051; B01J 2219/00162
  See application file for complete search history.

(56) References Cited

U.S. PATENT DOCUMENTS

| 9,295,964 | B2 * | 3/2016 | Nguyen | C08L 23/06 |
| 10,730,818 | B2 * | 8/2020 | Trahan | C07C 45/52 |

* cited by examiner

*Primary Examiner* — Natasha E Young
(74) *Attorney, Agent, or Firm* — Porus IP LLC

(57) ABSTRACT

Disclosed is device and method for controlling pressure of high-temperature and high-pressure reactor. The device includes an automatic pressurizing unit, a manual pressurizing unit, a temperature boosting and pressure boosting control unit, and a temperature and pressure control panel. A first valve, a first pressure gauge, a second valve, and a second pressure gauge are successively provided between the automatic pressurizing unit and the manual pressurizing unit. A pipeline where the temperature boosting and pressure boosting control unit is located is connected between the first pressure gauge and the second valve by a tee. The temperature and pressure control panel is connected to the automatic pressurizing unit, the manual pressurizing unit, and the temperature boosting and pressure boosting control unit by a wire.

7 Claims, 3 Drawing Sheets

DEVICES AND METHODS FOR CONTROLLING PRESSURE OF HIGH-TEMPERATURE AND HIGH-PRESSURE REACTORS

TECHNICAL FIELD

The present disclosure relates to the field of high-temperature and high-pressure experimental earth science and technology, and in particular, relates to devices and methods for controlling pressure of high-temperature and high-pressure reactors.

BACKGROUND

The study of geologic processes in the interior of the earth helps us understand the evolution of the earth, the formation of geologic hazards and resources, and changes in the climate and environment of the Earth's surface layers. However, current knowledge of the interior of the earth comes mainly from samples of the deep earth and the results of high-temperature and high-pressure experiments. High-temperature and high-pressure experiments play a very important role in the field of earth science since samples from the deep earth are very limited and difficult to be obtained.

Under the conditions of modern science and technology, the high-temperature and high-pressure experimental device is an important means of simulating the interior conditions of the earth, studying the high-temperature and high-pressure geological processes, and determining the physicochemical parameters in geology. The rapid quenching cold-sealed pressure vessels, as one of the important high-temperature and high-pressure devices, plays an important role in simulating the physicochemical reactions within the crust of the earth, especially the magmatic-hydrothermal process. Pressure control is very important for running the rapid quenching cold-sealed pressure vessels, and at present, in terms of pressure regulation and control of the cold-sealed pressure vessels, the pressure is adjusted using the air compressor or the manual pressure pump, and the experimental real-time pressure may be monitored using the pressure gauges or pressure sensors. The manner for pressure regulation and monitoring may mainly include an air compression pressure boosting and pressure relief manner, a manual pump pressure boosting and pressure relief manner, and a pressure gauge monitoring and sensor monitoring manner. The existing pressure regulation and monitoring have the following limitations.

(1) Although the compressed air pump pressurizes the whole set of autoclaves rapidly, it is difficult to control the rate. The pressure is relieved using the pressure relief, but fine-tuning cannot be achieved.

(2) The pressure gauge may usually not read relatively accurate pressure values when monitoring the pressure. Later, the pressure sensor is developed to display the pressure value electronically, but the pressure value of each reactor may not be monitored. The needle valve may need to be opened for detection if the pressure value in the reactor in the experiment is required to be read.

(3) The high-temperature and high-pressure experiment usually lasts for several days to more than ten days. During the experiment, the change in the pressure value of each autoclave may only be recorded manually for many times, and there is a lack of devices for continuous automatic recording of pressure.

In summary, the pressure control system of the rapid quenching cold-sealed pressure vessels in existing technology is relatively simple, and the pressure boosting is single, the pressure control is difficult to meet the requirements of the fine experiments, and the accuracy of the pressure control is relatively low, and the pressure may not be independently monitored for a single reactor.

SUMMARY

The present disclosure provides devices and methods for controlling pressure of high-temperature and high-pressure reactors. More specifically, the present disclosure provides devices and methods for controlling pressure of high-temperature and high-pressure reactors that combines automatic and manual fine-tuning, which is upgrade design for the pressure control system of the rapid quenching cold-sealed pressure vessels. After the system improvement, it is easy to debug and control pressure, and further enhances the pressure accuracy, so that the pressure in the experimental process is more stable and visualized, which has positive significance for the experimental research. Therefore, the present disclosure provides the following technical solution.

The present disclosure provides a device for controlling pressure of a high-temperature and high-pressure reactor. The device may include an automatic pressurizing unit, a manual pressurizing unit, a temperature boosting and pressure boosting control unit, and a temperature and pressure control panel.

A first valve, a first pressure gauge, a second valve, and a second pressure gauge may be successively disposed between the automatic pressurizing unit and the manual pressurizing unit.

A pipeline where the temperature boosting and pressure boosting control unit is located may be connected between a first pressure gauge and a second valve by a tee. The pipeline may be successively provided with a first pressure relief valve, a third pressure gauge, and a main valve, and the main valve may be equipped with a first pressure sensor.

The temperature and pressure control panel may be connected to the automatic pressurizing unit, the manual pressurizing unit, and the temperature boosting and pressure boosting control unit by a wire.

Further, the automatic pressurizing unit may include an air compressor, a pressure pump, and a first water tank. The first water tank may be disposed between the air compressor and the pressure pump.

Further, the manual pressurizing unit may include a hand pressure pump, a hand crank pump, and a second water tank. The hand pressure pump and the hand crank pump may be connected in parallel. The hand pressure pump and the second water tank may be connected in series, and a third valve may be disposed between the hand pressure pump and the second water tank. The hand crank pump and the second water tank may be connected in series, and a fourth valve may be disposed between the hand crank pump and the second water tank.

Further, the temperature boosting and pressure boosting control unit may include a plurality of groups of temperature boosting and pressure boosting control devices, and each group of temperature boosting and pressure boosting control devices may be connected in parallel. A first temperature boosting and pressure boosting control device may include a first annular furnace, a first autoclave, and a fifth valve connected successively. The fifth valve may be equipped with a second pressure sensor.

Further, the tee may be disposed between the second valve and the second pressure gauge, and the second pressure relief valve may be connected to the second water tank via the tee.

Further, the temperature and pressure control panel may include a display device configured to display monitored pressure and temperature data.

Based on the device, the present disclosure also provides a method for controlling pressure of a high-temperature and high-pressure reactor. The method may include following steps.

Step S1, initially pressurizing the device, including pressurizing the device automatically or manually;

Step S2, controlling pressure of the device by pressurizing the device manually during a temperature boosting process;

Step S3, monitoring pressure during a temperature boosting and pressure control process and an experimental process;

Step S4, recording and exporting pressure sensor data; and

Step S5, repeating steps S1 to S4 to control and monitor pressure of the initial pressurization process, the temperature boosting and pressure control process, the high-temperature experimental process, and a quenching experiment process.

The present disclosure also provides an electronic device including at least one processor and a memory configured to store one or more programs. When the one or more programs are executed by the at least one processor, the one or more programs may direct the at least one processor to implement the method for controlling pressure of a high-temperature and high-pressure reactor The present disclosure also provides a storage medium comprising computer-executable instructions, when executed by at least one processor of a computer, the computer-executable instructions direct the at least one processor to perform a method for controlling pressure of a high-temperature and high-pressure reactor.

Technical effects and advantages of the present disclosure are as follows.

1. The present disclosure can easily and flexibly boost and adjust the autoclave pressure by means of an automatic and manual pressure control system and control the pressure more accurately by combining the coarse adjustment and fine adjustment manners.

2. In the present disclosure, the real-time pressure at different positions and of each autoclave may be simultaneously monitored using a plurality of pressure gauges and pressure sensors, and at the same time, the pressure gauges and pressure sensors have a pressure recording function, so that real-time curves and historical curves of different pressure sensors may be viewed, and the data may be exported for saving.

Other features and advantages of the present disclosure may be set forth in the subsequent description and, in part, become apparent from the description or become known by implementing the present disclosure. The objects and other advantages of the present disclosure may be realized and obtained by means of the structure indicated in the specification and the drawings.

BRIEF DESCRIPTION OF THE DRAWINGS

In order to more clearly illustrate the technical solutions related to the embodiments or prior art of the present disclosure, a brief introduction of the drawings referred to the description of the embodiments or the prior art is provided below. Obviously, the drawings described below are only some embodiments of the present disclosure. Those skilled in the art may obtain other drawings according to these drawings without further creative effort.

Figure 1:
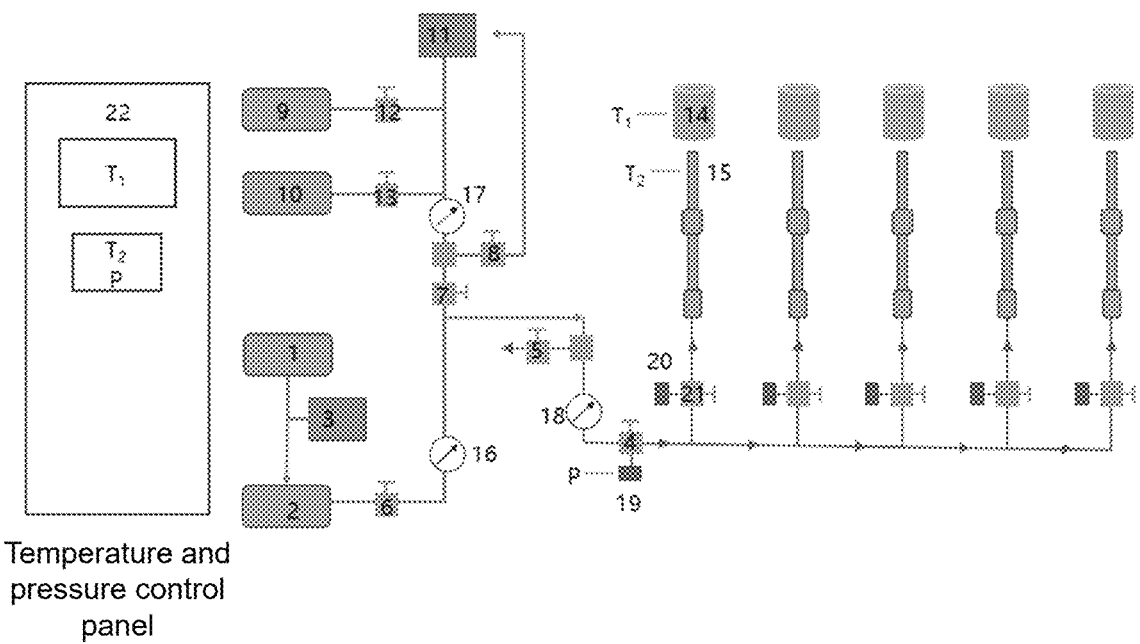
FIG. 1 is a schematic diagram of a device for controlling pressure of a high-temperature and high-pressure reactor according to some embodiments of the present disclosure.

In the drawings, 1, an air compressor; 2, a pressure pump; 3, a first water tank; 4, a main valve; 5, a first pressure relief valve; 6, a first valve; 7, a second valve; 8, a second pressure relief valve; 9, a hand pressure pump; 10, a hand crank pump; 11, a second water tank; 12, a third valve; 13, a fourth valve; 14, a first annular furnace; 15, a first autoclave; 16, a first pressure gauge; 17, a second pressure gauge; 18, a third pressure gauge; 19, a first pressure sensor; 20, a second pressure sensor; 21, a fifth valve; 22, a temperature and pressure control panel.

DETAILED DESCRIPTION

The technical solutions in the embodiments of the present disclosure will be clearly and completely described below in conjunction with the drawings in the embodiments of the present disclosure. Obviously, the embodiments are only a portion of the embodiments of the present disclosure, and not all of the embodiments. Based on the embodiments in the present disclosure, all other embodiments obtained by those skilled in the art without making creative efforts fall within the scope of protection of the present disclosure.

The present disclosure discloses a device for controlling pressure of a high-temperature and high-pressure reactor to solve the deficiencies of the prior art. FIG. 1 is a schematic diagram of a device for controlling pressure of a high-temperature and high-pressure reactor according to some embodiments of the present disclosure. As shown in FIG. 1, the device may include an automatic pressurizing unit, a manual pressurizing unit, a temperature boosting and pressure boosting control unit, and a temperature and pressure control panel 22.

The automatic pressurizing unit may include an air compressor 1, a pressure pump 2, and a first water tank 3. The first water tank 3 may be disposed between the air compressor 1 and the pressure pump 2.

The manual pressurizing unit may include a hand pressure pump 9, a hand crank pump 10, and a second water tank 11. The hand pressure pump 9 and the hand crank pump 10 may be connected in parallel. The hand pressure pump 9 and the second water tank 11 may be connected in series, and a third valve 12 may be disposed between the hand pressure pump 9 and the second water tank 11. The hand crank pump 10 and the second water tank 11 may be connected in series, and a fourth valve 13 may be disposed between the hand crank pump 10 and the second water tank 11.

The temperature boosting and pressure boosting control unit may include a plurality of groups of temperature boosting and pressure boosting control devices. Each group of temperature boosting and pressure boosting control devices may be connected in parallel. The first temperature boosting and pressure boosting control device may include a first annular furnace 14, a first autoclave 15, and a fifth valve 21. The fifth valve 21 may be equipped with a second pressure sensor 20.

A first valve 6, a first pressure gauge 16, a second valve 7, and a second pressure gauge 17 may be successively disposed between the automatic pressurizing unit and the manual pressurizing unit. A tee may be disposed between the second valve 7 and the second pressure gauge 17, and the second pressure relief valve 8 may be connected to the second water tank 11 via the tee.

A pipeline where the temperature boosting and pressure boosting control unit is located may be connected between the second valve 7 and the first pressure gauge 16 by the tee. The pipeline may be successively provided with a first pressure relief valve 5, a third pressure gauge 18, and a main valve 4. The main valve 4 may be equipped with a first pressure sensor 19.

The temperature and pressure control panel 22 may be connected to the automatic pressurizing unit, the manual pressurizing unit, and the temperature boosting and pressure boosting control unit by a wire. The temperature and pressure control panel 22 may include a display device. Each pressure sensor and the thermocouple may directly measure pressure and temperature in the autoclave, and the measured value may be transmitted to a panel of the display device by a wire.

Figure 2:
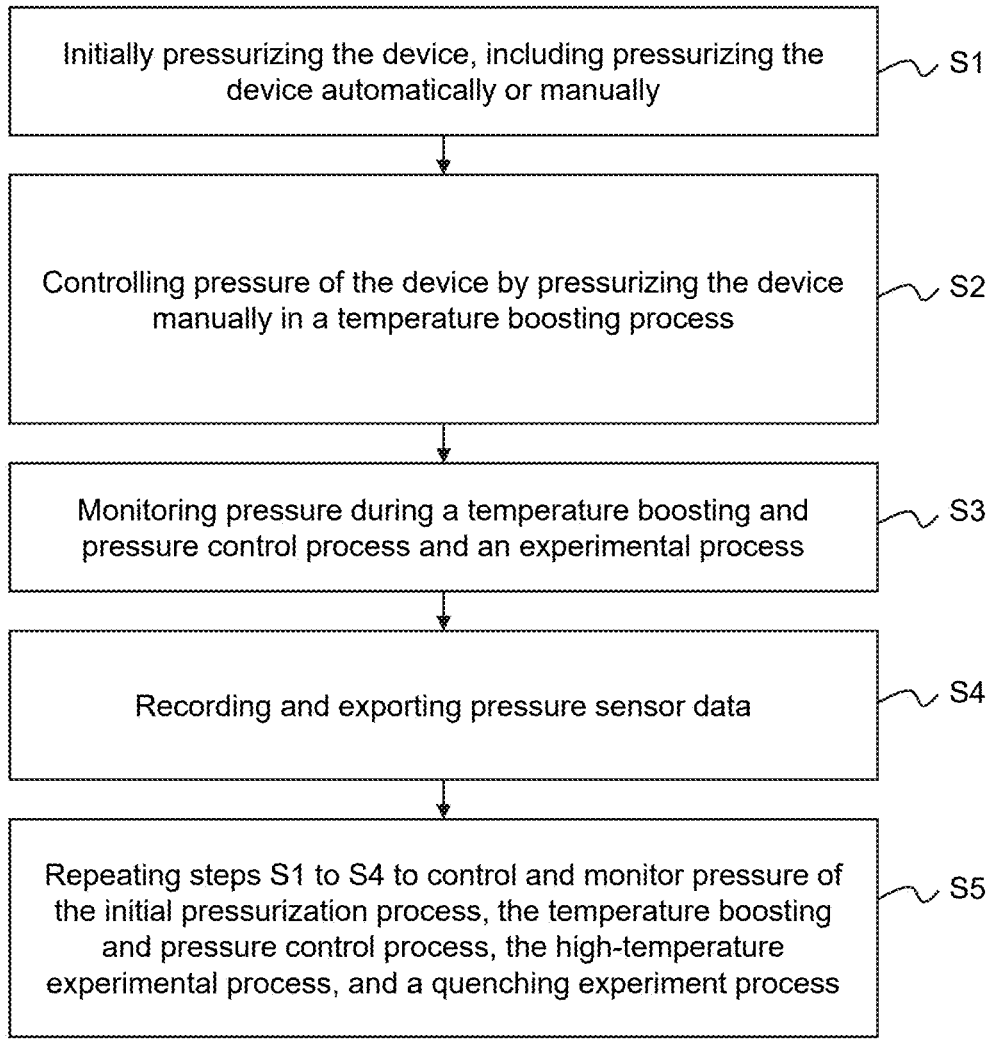
FIG. 2 is a flowchart illustrating a process of a method for controlling pressure of a high-temperature and high-pressure reactor according to some embodiments of the present disclosure.

Based on the device, the present disclosure also discloses a method for controlling pressure of a high-temperature and high-pressure reactor. FIG. 2 is a flowchart illustrating a process of a method for controlling pressure of a high-temperature and high-pressure reactor provided according to some embodiments of the present disclosure. As shown in FIG. 2, the method may include the following operations.

In step S1, the device may be initially pressurized. The initially pressurizing the device may include pressurizing the device automatically or manually.

The device may be pressurized automatically as follows.

In step S1.1, the air compressor 1, the pressure pump 2, and the first water tank 3 may be connected to a main pipeline, and the first water tank may be filled with distilled water.

In step S1.2, the air compressor 1 may be started, the main valve 4 and the second valve 7 connected to the main pipeline and the pressure pump 2 at the same time may be closed, the first pressure relief valve 5 and the first valve 6 may be opened, and air in the pressure pump 2 and the pipeline may be discharged.

In step S1.3, the first pressure relief valve 5 may be closed, and the main pipeline valve (i.e., the main valve 4) may be opened at the same time to pressurize the device. If the pressure is required to be pressurized to a higher pressure when pressure boosting stops, a pressure value of the air compressor 1 may be increased to pressurize the device to be about 200 MPa~220 MPa.

In step S1.4, the water in the pressure pump 2 may be discharged by closing the main valve 4 and opening the first pressure relief valve 5.

The device may be pressurized manually as follows.

In step S1.1, the first valve 6 between the automatic pressurizing unit and the manual pressurizing unit may be closed and the second water tank 11 in the manual pressurizing unit may be filled with the distilled water.

In step S1.2, the pressure of the device may be increased to about 100 MPa~110 MPa by continuously pressurizing the hand pressure pump 9.

In step S1.3, if a higher pressure is required to be increased, the third valve 12 between the hand pressure pump 9 and the hand crank pump 10 may be closed, and the pressure of the device may be increased to about 200 MPa~220 MPa by rotating the hand crank pump 10.

In step S1.4, after the pressure boosting is completed, the main valve 4 may be closed and the second pressure relief valve 8 may be opened to remove the pressure in the manual pressurizing unit.

In step S2, pressure of the device may be controlled by pressurizing the device manually in a temperature boosting process.

In step S2.1, the pressure may be controlled mainly using the hand crank pump 10 to more accurately control the pressure value during the temperature boosting process and may be finally adjusted to a target pressure. Before the temperature boosting, the main valve 4 may be opened to make a pipeline of the first autoclave 15 of the main pipeline and the hand pressure pump 9 connected, and the pressure may be set to a suitable value (e.g., the target pressure of 200 MPa), and an initial pressure may be set to about 100 MPa~110 MPa.

In step S2.2, the first autoclave 15 may be heated by heating the first annular furnace 14, pressure medium water inside the first autoclave 15 may expand since the temperature increases, and the pressure inside the device may increase. At this time, the pressure may be raised or lowered by fine-tuning the hand crank pump 10 according to a temperature change inside the first autoclave 15 to achieve a reasonable temperature boosting and pressure boosting process.

It should be noted that the structure including the first annular furnace 14, the first autoclave 15, the second pressure sensor 20, and the third valve 21 in the temperature boosting and pressure boosting control unit may be one or more sets of combinations, and five sets of combinations are shown in FIG. 1.

In step S2.3, when the pressure in the system is about to exceed the target pressure, the pressure may be lowered by the hand crank pump 10; when the hand crank pump 10 reaches the top and is not relieved, the main valve 4 may be closed, and the first pressure relief valve 5 may be opened to reduce the internal pressure of the hand crank pump 10, and at the same time, the hand crank pump 10 may be adjusted to a suitable pressure position, and the main valve 4 may be opened to continue to precisely control the pressure.

In step S3, the pressure may be monitored during a temperature boosting and pressure control process and an experimental process.

In step S3.1, the first pressure gauge 16 and the second pressure gauge 17 respectively in the automatic pressurizing unit and the manual pressurizing unit may monitor the pressure in real time, and at the same time, the third pressure gauge 18 and the first pressure sensor 19 in the main pipeline may monitor the overall pressure.

In step S3.2, during the temperature boosting and pressure boosting process, a pressure change of different pipelines may be observed in real time by the first pressure gauge 16, the second pressure gauge 17, the third pressure gauge 18, or the first pressure sensor 19, the second pressure sensor 20, etc. connected to each pipeline.

In step S3.3, after the temperature boosting and pressure boosting is completed, and the pressure is adjusted to the target pressure using the hand crank pump 10, the valve corresponding to each autoclave in the temperature boosting and pressure boosting control unit may be closed, so that the pressure sensor connected to each autoclave may display the pressure value inside the autoclave.

In step S3.4, the pressure value may be periodically read, recorded, and adjusted until the experiment ends.

In step S4, pressure sensor data may be recorded and exported.

The value of the pressure sensor connected to the main pipeline and each autoclave may be read on the temperature and pressure control panel 22. A real-time pressure change trend graph may be displayed on the temperature and pressure control panel 22, for example, one or more sets of pressure curves over time may be displayed by selecting and canceling functions.

After the experiment ends, the historical curve of the pressure change may be viewed through the temperature and pressure control panel 22 to achieve the analysis of the pressure change process experienced by the experiment on the experiment. At the same time, the text data of pressure and time in the pressure sensor may be exported via a Universal Serial Bus (USB) flash drive for further analysis on an office computer.

In step S5, the steps S1 to S4 may be repeated to control and monitor the pressure of the initial pressurization process, the temperature boosting and pressure control process, the high-temperature experimental process, and a quenching experimental process may be.

It should be noted that if an autoclave leakage occurs during the high-temperature experiment, the experiment needs to be terminated, and the autoclave needs to be replaced to repeat the steps S1 to S4 to continue the experiment.

Figure 3:
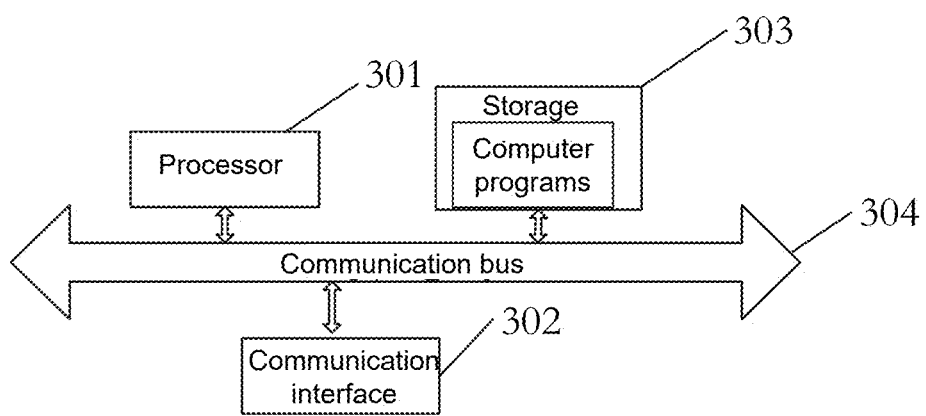
FIG. 3 is a schematic diagram of an electronic device according to some embodiments of the present disclosure.

Based on the same inventive concept, the present disclosure also provides an electronic device. FIG. 3 is a schematic diagram of an electronic device according to some embodiments of the present disclosure. As shown in FIG. 3, the electronic device may include at least one processor 301, at least one communication interface 302, at least one memory 303, and at least one communication bus 304. The processor 301, the communication interface 302, and the memory 303 may communicate with each other via the communication bus 304.

The memory 303 may be configured to store computer programs.

The processor 301 may be configured to implement the method for controlling pressure of a high-temperature and high-pressure reactor when executing the programs stored in the memory 303.

Optionally, the communication interface may be an interface of a communication module (e.g., an interface of a Generic Software Module (GSM)). The processor may be Central Processing Unit (CPU), an Application Specific Integrated Circuit (ASIC), or one or more integrated circuits configured to implement embodiments of the present disclosure. The memory may include a high-speed random-access memory (RAM) or also include a non-volatile memory (e.g., at least one disk memory). The memory may store the programs and the processor may call the programs stored in the memory to implement a portion or all of the method embodiments described above.

Based on the same inventive concept, the present disclosure also provides a computer-readable storage medium storing computer programs. When executed, the computer programs may implement a portion or all of the method embodiments described above. Optionally, the storage medium may be a non-transitory computer-readable storage medium. For example, the non-transitory computer-readable storage medium may be a read-only memory (ROM), a random access memory (RAM), a CD-ROM, a magnetic tape, a floppy disk, and an optical data storage device, etc.

Finally, it should be noted that the description is only a preferred embodiment of the present disclosure, and is not intended to limit the present disclosure. Notwithstanding that the present disclosure has been described in detail with reference to the embodiments, those skilled in the art may modify the technical solutions recorded in the embodiments or replace some of the technical features with equivalent ones. Any modification, equivalent replacement, improvement, etc., made within the spirit and principles of the present disclosure shall be included in the scope of protection of the present disclosure.

What is claimed is:

1. A device for controlling pressure of a high-temperature and high-pressure reactor, comprising an automatic pressurizing unit, a manual pressurizing unit, a temperature boosting and pressure boosting control unit, and a temperature and pressure control panel, wherein
   a first valve, a first pressure gauge, a second valve, and a second pressure gauge are successively disposed between the automatic pressurizing unit and the manual pressurizing unit;
   a pipeline where the temperature boosting and pressure boosting control unit is located is connected between the first pressure gauge and the second valve by a tee, and the pipeline is successively provided with a first pressure relief valve, a third pressure gauge, and a main valve, the main valve being equipped with a first pressure sensor; and
   the temperature and pressure control panel is connected to the automatic pressurizing unit, the manual pressurizing unit, and the temperature boosting and pressure boosting control unit by a wire.

2. The device for controlling pressure of the high-temperature and high-pressure reactor of claim 1, wherein the automatic pressurizing unit includes an air compressor, a pressure pump, and a first water tank, the first water tank being disposed between the air compressor and the pressure pump.

3. The device for controlling pressure of the high-temperature and high-pressure reactor of claim 2, wherein the manual pressurizing unit includes a hand pressure pump, a hand crank pump, and a second water tank;
   the hand pressure pump and the hand crank pump are connected in parallel;
   the hand pressure pump and the second water tank are connected in series, and a third valve is disposed between the hand pressure pump and the second water tank; and
   the hand crank pump and the second water tank are connected in series, and a fourth valve is disposed between the hand crank pump and the second water tank.

4. The device for controlling pressure of the high-temperature and high-pressure reactor of claim 3, wherein the temperature boosting and pressure boosting control unit includes a plurality of groups of temperature boosting and pressure boosting control devices, and each group of temperature boosting and pressure boosting control devices is connected in parallel; wherein
   a first temperature boosting and pressure boosting control device includes a first annular furnace, a first autoclave, and a fifth valve that are connected successively, the fifth valve being equipped with a second pressure sensor.

5. The device for controlling pressure of the high-temperature and high-pressure reactor of claim 1, wherein the tee is disposed between the second valve and the second pressure gauge, and a second pressure relief valve is connected to a second water tank via the tee.

6. The device for controlling pressure of the high-temperature and high-pressure reactor of claim 1, wherein the temperature and pressure control panel includes a display device configured to display monitored pressure and temperature data.

7. A method for controlling pressure of a high-temperature and high-pressure reactor, executed by a device for controlling pressure of the high-temperature and high-pressure reactor, wherein the device comprises an automatic pressurizing unit, a manual pressurizing unit, a temperature boosting and pressure boosting control unit, and a temperature and pressure control panel, wherein
 a first valve, a first pressure gauge, a second valve, and a second pressure gauge are successively disposed between the automatic pressurizing unit and the manual pressurizing unit;
 a pipeline where the temperature boosting and pressure boosting control unit is located is connected between the first pressure gauge and the second valve by a tee, and the pipeline is successively provided with a first pressure relief valve, a third pressure gauge, and a main valve, the main valve being equipped with a first pressure sensor; and
 the temperature and pressure control panel is connected to the automatic pressurizing unit, the manual pressurizing unit, and the temperature boosting and pressure boosting control unit by a wire;
the method comprising:
initially pressurizing the device, including pressurizing the device automatically or manually;
controlling pressure of the device by pressurizing the device manually during a temperature boosting process;
monitoring pressure during a temperature boosting and pressure control process and an experimental process;
recording and exporting pressure sensor data; and
repeating above operations to control and monitor pressure of an initial pressurization process, the temperature boosting and pressure control process, the experimental process, and a quenching experiment process.

* * * * *